(12) United States Patent
Duncan et al.

(10) Patent No.: US 7,232,030 B2
(45) Date of Patent: Jun. 19, 2007

(54) QUICK RELEASE HOLDER FOR A BEADING OF A CONVEYOR BELT AND METHOD OF USING QUICK RELEASE HOLDER

(75) Inventors: Stephen D. Duncan, Arlington, TX (US); Donald K. Wier, Mansfield, TX (US); John K. Crowley, Cleburne, TX (US)

(73) Assignee: Transnorm System Inc., Arlington, TX (US)

( * ) Notice: Subject to any disclaimer, the term of this patent is extended or adjusted under 35 U.S.C. 154(b) by 322 days.

(21) Appl. No.: 10/996,909

(22) Filed: Nov. 24, 2004

(65) Prior Publication Data

US 2006/0108207 A1    May 25, 2006

(51) Int. Cl.
*B65G 15/02* (2006.01)
(52) U.S. Cl. ....................... 198/831; 198/837
(58) Field of Classification Search ............. 198/831, 198/837, 840
See application file for complete search history.

(56) References Cited

U.S. PATENT DOCUMENTS

| | | | |
|---|---|---|---|
| 1,254,941 A | 1/1918 | Snow | |
| 3,217,861 A | 11/1965 | Daniluk et al. | |
| 3,901,379 A | 8/1975 | Bruhm | |
| 4,024,949 A | 5/1977 | Kleysteuber et al. | |
| 4,846,338 A | 7/1989 | Widmer | |
| 4,955,466 A | 9/1990 | Almes et al. | |
| 5,038,925 A | 8/1991 | Chrysler | |
| 5,332,082 A | 7/1994 | Sommerfield | |
| 5,332,083 A | 7/1994 | Axmann | |
| 5,360,102 A | 11/1994 | Schoning | |
| 5,394,977 A | 3/1995 | Cline | |
| 5,682,975 A | 11/1997 | Wells | |
| 5,839,570 A * | 11/1998 | Vertogen et al. | 198/831 |
| 5,944,171 A * | 8/1999 | Vertogen et al. | 198/837 |
| 6,564,931 B1 | 5/2003 | Edelmann | |
| 6,962,252 B2 * | 11/2005 | Fujiwara et al. | 198/831 |

* cited by examiner

*Primary Examiner*—James R. Bidwell
(74) *Attorney, Agent, or Firm*—Kenneth F. Pearce

(57) ABSTRACT

The present invention is related to quick release holders that grip the beading of a conveyor belt. Due to a holder's unique structure, without the use of tools, the holder can manually be opened to release the beading and the conveyor belt. Conversely, without the use of tools, the holder can also be manually closed to secure the beading.

17 Claims, 9 Drawing Sheets

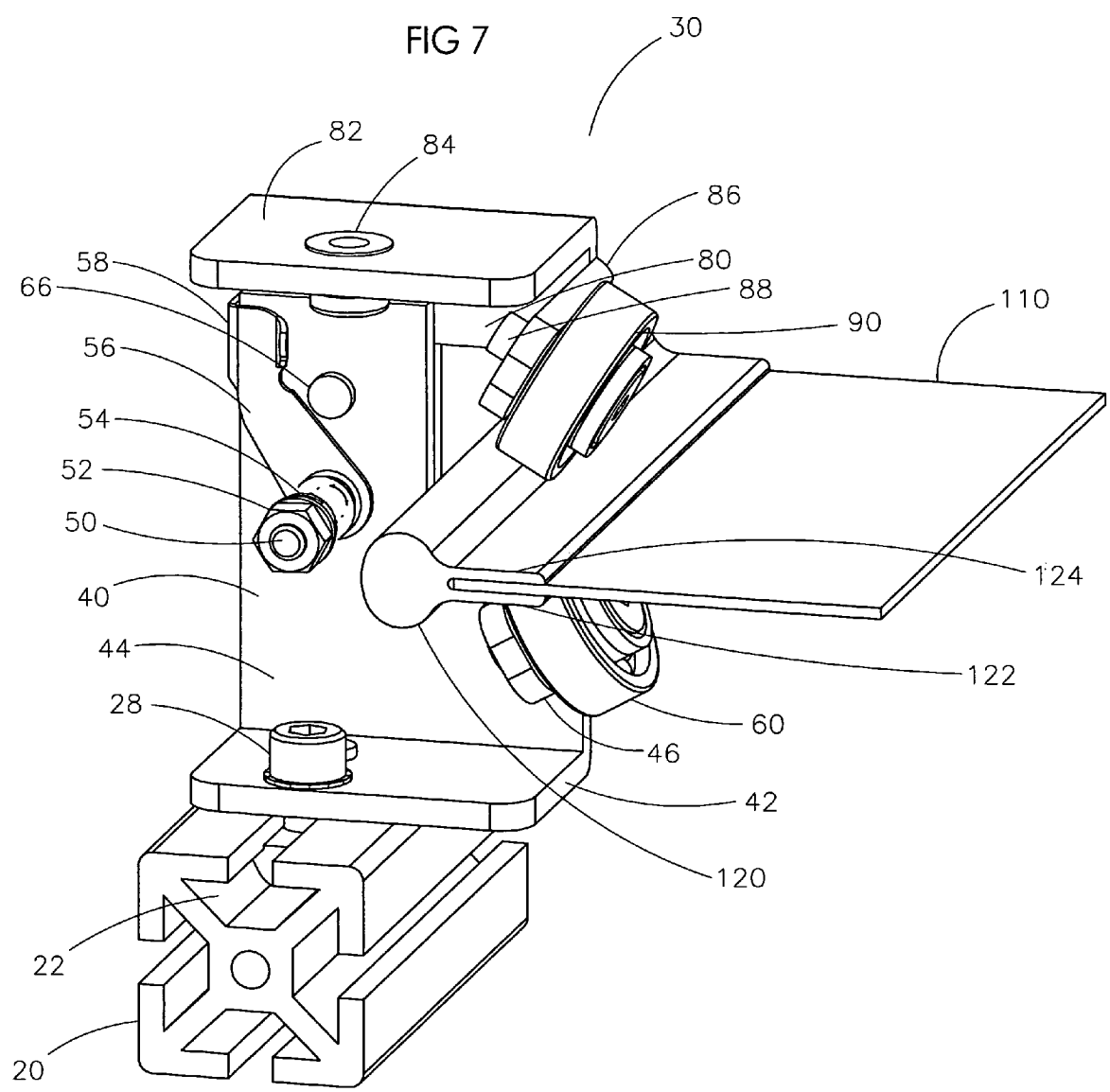

FIG 8

| Attaching a holder for a beading to the frame of a conveyor where the holder includes a mounting bracket having a rotable bearing thereon |

| Loading a spring onto a bolt and bolting a pivoting bracket having a rotable bearing thereon to the mounting bracket |

| Opening or closing the holder by manually tensioning the spring loaded bolt such that the pivoting bracket can pivot about the bolt |

| Moving the pivoting bracket's rotable bearing toward or away from the mounting bracket's rotable bearing |

FIG 9

| Attaching a holder for a beading to the frame of a conveyor where the holder includes a mounting bracket having an arm extending therefrom and rotable bearing thereon |

| Loading a spring onto a bolt and bolting a pivoting bracket having an arm extending therefrom and a rotable bearing thereon to the mounting bracket |

| Opening or closing the holder by manually tensioning the spring loaded bolt such that the pivoting bracket can pivot about the bolt |

| Moving the pivoting bracket's rotable bearing toward or away from the mounting bracket's rotable bearing |

FIG 10

Attaching a holder for a beading to the frame of a conveyor where the holder includes a mounting bracket having an arm extending therefrom and rotable bearing thereon

Loading a spring onto a bolt and bolting a pivoting bracket having an arm extending therefrom and a rotable bearing thereon to the mounting bracket

Extending a pin between the mounting bracket and the pivoting bracket

Opening or closing the holder by manually tensioning the spring loaded bolt such that the pivoting bracket can move away from the pin and pivot about the bolt

Moving the pivoting bracket's rotable bearing toward or away from the mounting bracket's rotable bearing

FIG 11

Attaching a holder for a beading to the frame of a conveyor where the holder includes a mounting bracket having an arm extending therefrom and rotable bearing thereon

Loading a spring onto a bolt and bolting a pivoting bracket having an arm extending therefrom and a rotable bearing thereon to the mounting bracket

Extending a pin between the mounting bracket and the pivoting bracket

Extending a pivotable fastener from the bolt for clipping the mounting bracket and the pivoting bracket

Opening or closing the holder by manually manipulating the fastener and tensioning the spring loaded bolt such that the pivoting bracket can move away from the pin and pivot about the bolt

Moving the pivoting bracket's rotable bearing toward or away from the mounting bracket's rotable bearing

QUICK RELEASE HOLDER FOR A BEADING OF A CONVEYOR BELT AND METHOD OF USING QUICK RELEASE HOLDER

BACKGROUND OF THE INVENTION

1. Field of the Invention

Among other things, the present invention is related to a holder mounted to a conveyor frame. The holder includes a mounting bracket and a pivoting bracket. A plurality of holders are mounted to the conveyor frame to grip tautly the beading of the conveyor belt as the belt circulates about the conveyor. Due to a holder's unique structure, without the use of tools, the holder can manually be opened to release the beading and the conveyor belt, or manually closed to grip the beading.

2. Description of the Previous Art

1) U.S. Pat. No. 5,955,466-Almes, et. al., owned by Applicant, discloses a belt conveyor with a belt reinforcing member. FIG. 1 discloses a beading and a beading holder. However, the '466 patent is silent regarding a spring loaded pivoting beading holder.

2) U.S. Pat. No. 5,360,102-Schoning, owned by Applicant, enables a belt conveyor with rotary guides for marginal portions of the belt. FIG. 3 discloses a beading and a beading holder. However, like Almes, the '102 patent is silent regarding a spring loaded pivoting beading holder.

3) U.S. Pat. No. 1,254,941-Snow discloses a corner for conveyors. The Snow Patent does not teach a beading or a beading holder.

4) U.S. Pat. No. 3,217,861-Daniluk, et al. describes an endless belt conveyor. The Daniluk Patent teaches the use of grommets 52 and rollers 54. The '861 patent does not disclose a beading or a beading holder.

5) U.S. Pat. No. 3,901,379-Bruhm teaches an angular guidance for conveyor belt systems. Columns 2 and 3 teach, "As shown in FIG. 4 the shoulder 10 is provided with oblique side faces 17 against which the cylindrical running surfaces of rollers 12 and 14 come to rest, which rollers are uniformly spaced over the entire length of the edge rail 4. The rollers 12 on the external sides of the belt are equipped with axes 13 while the rollers 14 mounted on the inner side are provided with axes 15 . . . The roller pairs 12 and 14 are housed in portion 7a of the curve guidance frame 7, which portion encompasses shoulder 10." The '379 patent does not teach or disclose a spring loaded pivoting beading holder.

6) U.S. Pat. No. 4,024,949-Kleysteuber, et al. discloses a traverse bendable endless belt conveyor. FIG. 3 and Column 4 reveal, "Brackets 24, 25 support the rollers 15, 16 that hold the respective beads 12, 13. The drive motors 17 along the upper run are positioned within the bracket and framework 20, as shown. Suitable support casters 26, 27, or other support feet, such as skids, are provided along the bottom cross member 23 for support of the structure on the floor F of a mining passage, for example." The '949 patent does not teach or disclose a spring loaded pivoting beading holder.

7) U.S. Pat. No. 4,846,338-Widmer enables a curved conveyor element. Column 2 teaches, "Rollers 19, during their rotation on pin 18, are supported on their jacket surfaces by a guide face 23 of guide rails 13 and 14. In this embodiment of the invention, dog members 22 are fastened to conveyor belt 1 by rivets 24 and 25 and a tongue 26, conveyor belt 1 being pulled by dog members 22. The dog members are disposed below the upper reach 1a of conveyor belt 1 so that goods being transported may project beyond the outer curvature of the conveyor belt when traveling through the curves." The '338 patent does not teach or disclose a spring loaded pivoting beading holder.

8) U.S. Pat. No. 5,038,925-Chrysler enables a conveyor for transporting articles along a curved path. FIG. 3 and Column 4 teach, "The outer frame 116 includes an upper pair of guide rails 136, 138 arranged adjacent the upper portion of the endless belt 132 and a lower pair of guide rails 140, 142 arranged adjacent the lower portion of the endless belt. The first pair of guide rails 136, 138 are horizontally and vertically offset from each other and extend continuously along the length of the outer edge of the upper portion of the endless belt 132. Similarly, the lower pair of guide rails 140, 142 are horizontally and vertically offset from each other and extend continuously along the length of the outer edge of the lower portion of the endless belt 132. As a result of the spaced apart relationship between guide rails 136 and 138 and guide rails 140 and 142, there is formed an upper path 144 and a lower path 146, respectively, for receiving a plurality of guide assemblies 148." The '925 patent does not teach or disclose a spring loaded pivoting beading holder.

9) U.S. Pat. No. 5,332,082-Sommerfield describes a conveyor turn drive. Column 3 reads, "A guide rail 31 wall forming part of the outer rail structure is slotted to receive the upper course 30a (refer to FIG. 4) of the belt, which rides on a bed structure indicated at 32 forming part of on the frame of the machine. A series of guide rollers 33 is secured to the belt along a line parallel to the outer edge for engagement with the guide rail 31 above and below the slot engaged by the belt. The lower (return) course of the belt is engaged in a similar slot in the portion of the guide rail 31 opposite the path of the lower course." The '082 patent does not teach or disclose a spring loaded pivoting beading holder.

10) U.S. Pat. No. 5,332,083-Axmann enables a curved belt conveyor. Column 4 reads:

Any unavoidable longitudinal and transverse forces that occur as belt 11 circulates are accommodated by the smooth-out rollers 40 that rest against the side of elevation 32 facing the center of curvature. Any irregularities in the advance of the belt are compensated for by the resilient force of the rollers mounted on the pivoting levers 42. It has been demonstrated that wear on elevation 32 and belt 11 deriving from the pressure of smooth-out rollers 40 can be maintained very slight.

FIG. 3 illustrates only how the elevation 32 on upper strand 14 is engaged. The mechanisms and actions in the vicinity of the lower strand are identical.

In this embodiment pairs comprising one smooth-out roller 40 and one hold-down roller 41 rest against the elevation 32 at the edge of belt 11, the hold-down rollers against the top of the elevation and the smooth-out rollers against its inner side. Since the same situation occurs at the lower strand, the two strands will always rest precisely against belt-backing rollers 18.

Each smooth-out roller 40 rotates freely at an acute angle and each hold-down roller 41 perpendicular to belt 11 on the same lever 42. The lever pivots at pivot 43 on a countervailing bearing 44 that can be raised or lowered in a bracket 45 secured to outside wall 16. The bracket is an upside-down L with its upright secured to outside wall 16 and the its arm projecting toward the center 13 of curvature at a level above the belt. The countervailing bearing 44 for the lever 42 that hold-down roller 41 and smooth-out roller 40 rotate on is a threaded bolt that extends through the arm and is adjusted in height by nuts 46 and 46' that screw tight against the arm.

The hold-down roller 41 in each pair of rollers is maintained in position by raising or lowering countervailing bearing 44 and hence the pivot 43 that the lever 42 accommodating rollers 40 and 41 pivots from. The oblique smooth-out roller 40, however, is as aforesaid forced against the side of elevation 32 facing the center of curvature by tension spring 47. One end of tension spring 47 is attached to roller-accommodating lever 42 and the other end to another countervailing bearing in the form of a bolt 48 secured to outside wall 16. Bolt 48 is threaded and screws into a matching threaded bore of the bracket 45 of outside wall 16. The bolt is maintained in adjustment to the bracket and wall by a nut 49.

Axmann's spring 47 is attached to his roller-accommodating lever 42. Among other things, unlike Applicants' invention, the '083 patent does not disclose a spring-loaded bolt that connects a pivoting bracket to a mounting bracket and forces the pivoting bracket to contact the mounting bracket.

11) U.S. Pat. No. 5,394,977-Cline enables an apparatus for use in replacing conveyor belts. Column 3 discloses:

In FIG. 1, there is illustrated a power turn 2 comprising an endless conveyor belt 4 having an arcuate outer edge portion 6 and an arcuate inner edge portion 8. The endless conveyor belt 4 is mounted around conical rolls 10, only one shown, mounted on a frame 12. A portion of the frame 12 includes an arcuate support 14, in FIG. 2. A plurality of bearing standoffs 16 are mounted at circumferentially spaced apart locations on the arcuate support 14 using headed threaded bolts 18 threaded into threaded openings (not shown) in the arcuate support 14. Each bearing standoff 16 has a central body portion 20, an upper portion 22 which projects upwardly from the central body portion 20 and is inclined relative thereto and a lower portion 24 which projects downwardly from the central body portion 20 and is inclined relative thereto. Each of the upper and lower portions has an opening 26 and a slot 28 formed therein, FIG. 3, for purposes described below.

An angle bracket 40, FIG. 4, is mounted on each of the upper and lower portions 22 and 24. The angle bracket 40 has a first portion 42 and a second portion 44 having a 90 degree relationship. A roller bearing 46 having a cylindrical surface 48 is mounted on each second portion 44 using a headed threaded bolt 50 threaded into a threaded opening 52 in the second portion 44. The first portion 42 has a threaded opening 54 and a slot 56 having an off-set arcuate opening 58 formed therein.

The first portion 42 is pivotally mounted on each of the upper and lower portions 22 and 24 using a headed threaded bolt 60 passing through the opening 26 and threaded into the threaded opening 54. A roller bearing 62 having a cylindrical surface 64 is mounted on the first portion 42 using a headed threaded bolt 66 passing through the slot 28 and the arcuate opening 58, and the roller bearing 62 is secured where desired by the threaded nut 68.

Cline teaches the use of bolts 60 to mount bracket 40, roller bearing 62, roller bearing 46 to standoff 16. Cline's mount bracket 40 is not pivotable. The '977 patent does not teach or disclose a spring loaded pivoting beading holder.

12) U.S. Pat. No. 5,682,975-Wells defines a curved belt conveyor. Columns 3 and 4 read:

On the occurrence of a need to change the belt of the conveyor, the nut 48 may be slackened, and the slide plate 32 lifted relative to the wall 14, the lug 46 moved upwardly on the bolt 44, causing the trackway parts 22a, 24a to separate from the trackway parts 22b, 24b. Shown generally in dotted lines in FIG. 2. Such separation allows the roller assemblies 18 to pass between the said trackway parts, allowing the conveyor belt to be drawn on both upper and lower reaches from the frame in the direction C inwardly of the corner unit. Necessary repair or maintenance which may typically be replacement of one of the roller assemblies, or replacement of the bearing strip 26, of effective repair to the belt itself, may then be carried out relatively easily, prior to the remounting of the conveyor belt on the frusto-conical rollers 10, and return of the trackway parts of their FIG. 2 positions. Finally, the end most roller 10 may be moved outwardly to tension the belt, prior to recommencement of use of the conveyor system.

The '975 patent does not teach or disclose a spring loaded pivoting beading holder.

13) U.S. Pat. No. 6,564,931 B1-Edelmann enables a belt conveyor. Columns 5 and 6 read, "The guide rollers 12 are fastened on angled retaining arms 13 of a retaining structure 14 such that they act on the toothed-belt component 9 and/or on the bead 11 by way of inclined running surfaces. 15 designates bores of the retaining structure 14 which serve for external fastening on the belt table. The counterpressure device 10 is positioned and secured by a connection to the retaining arm 13, this connection being indicated by the dashed drill line designated 16." The '931 patent does not teach or disclose a spring loaded pivoting beading holder.

SUMMARY OF THE INVENTION

Unlike traditional conveyor belt beading holders, without the use of tools, the current holder can be manually opened or closed. The present invention includes a pivoting bracket connected to mounting bracket with a bolt, and more preferably, a spring-loaded bolt. The spring-loaded bolt causes the pivoting bracket to contact the mounting bracket whether the pivoting bracket is in its locked or pivoted position. When the holder is confined to its locked position, a dowel and a clip or fastener can further secure the pivoting bracket against the mounting bracket. A rotable bearing is attached to the pivoting bracket and another rotable bearing is attached to the mounting bracket such that the conveyor belt's beading can be gripped tautly while the beading's lips securing the conveyor belt and the conveyor belt can circulate through a passage between the two rotable bearings.

An aspect of the present invention is to provide a holder for the beading of a conveyor belt.

Still another aspect of the present invention is to provide a holder that can be manually opened or closed and locked, without the use of tools.

It is another aspect of the present invention to enable a method of manually and toollessly opening or closing the holder.

Yet another aspect of the present invention is to provide a holder that includes pivoting bracket and a mounting bracket connected by a bolt, and preferably, a spring-loaded bolt.

Still another aspect of the present invention is to provide a holder allows the operator to change or work on the conveyor belt, without requiring tools to release the conveyor belt's beading from the holder.

Yet still another aspect of the present invention is to utilize a dowel in conjunction with the pivoting bracket and the mounting bracket to further secure the pivoting bracket against the mounting bracket.

It is still another aspect of the present invention to provide a fastener or a clip to further secure the pivoting bracket against the mounting bracket.

An embodiment of the present invention can be described as a holder for a beading of a conveyor belt, comprising: a base supporting and integrally formed with a generally L-shaped lower bracket, wherein the base includes an aperture for receiving a bolt for attaching the base to a conveyor frame; a spring-loaded bolt for connecting the generally L-shaped lower bracket with a generally L-shaped pivoting upper bracket; a dowel extending between the generally L-shaped lower bracket and the generally L-shaped pivoting upper bracket; a first arm integrally formed with the generally L-shaped lower bracket for supporting a first roller bearing; a second arm integrally formed with the generally L-shaped pivoting upper bracket for supporting a second roller; and a lever pivotable about the spring-loaded bolt.

Another embodiment of the present apparatus can be described as a holder for a beading of a conveyor belt, comprising: a base supporting and integrally formed with a generally L-shaped lower bracket; a spring-loaded bolt for connecting the generally L-shaped lower bracket with a pivoting upper bracket such that the spring-loaded bolt causes the pivoting upper bracket to contact said generally L-shaped lower bracket; a first rotable bearing attached to the generally L-shaped lower bracket; a second rotable bearing attached to the pivoting upper bracket; and a lever pivotable about said spring-loaded bolt.

Yet another embodiment of the present device can be described as a holder for a conveyor belt, comprising: a stationary bracket for mounting said holder to a conveyor frame further comprising: a base, a shoulder standing from the base, and a first arm; a pivoting bracket extending above the shoulder comprising a second; a first rotable bearing mounted to the first arm; a second rotable bearing mounted to the second arm; a bolt connecting the stationary bracket and the pivoting bracket; and a fastener.

In still another embodiment, the present invention can be described as a holder for a conveyor belt, comprising: a mounting bracket for mounting the holder to a conveyor frame; a bolt connecting a pivoting bracket to the mounting bracket; a first roller bearing attached to the mounting bracket; a second roller bearing attached to the pivoting bracket; and a fastener to secure the pivoting bracket against the mounting bracket.

Yet another embodiment of the present device can be described as a method of toollessly opening or closing a holder for a conveyor belt comprising the steps of: disengaging the dowel extending between a mounting bracket and a pivoting bracket; tensioning the spring such that the pivoting bracket can pivot about a bolt; pivoting the pivoting bracket to move the pivoting bracket's rotable bearing either toward or away from the mounting bracket's rotable bearing.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 7 is a side view of an embodiment of a holder of the present invention showing the spring side of the spring-loaded bolt and the conveyor belt.

FIG. 8 is a depiction of the steps of an embodiment of the present invention.

FIG. 9 is an exemplification of the steps of yet another embodiment of the current method.

FIG. 10 is a diagrammatic representation of the steps of still another embodiment of the present invention.

FIG. 11 is another diagrammatic representation of the steps of still another embodiment of the present invention.

DESCRIPTION OF THE PREFERRED EMBODIMENTS

Although the disclosure hereof is detailed to enable those skilled in the art to practice the invention, the embodiments published herein merely exemplify the present invention.

Although the present invention can be practiced with straight conveyors, the preferred embodiments are preferably incorporated into conveyor curves. In the most general sense, a quick release holder is attached to a conveyor frame. In operation, the holder grips the conveyor belt's beading, but uniquely, to free the belt, the holder can toollessly and manually be pivoted to release the beading.

In most preferred embodiments, a mounting bracket is attached to the conveyor frame and a bolt connects the pivoting bracket to the mounting bracket. The brackets can be manufactured of metal or any other materials having adequate structure and strength to grip and hold conveyor belts. A first roller bearing extends from the mounting bracket to grip the beading, and similarly, a second roller bearing extends from the pivoting bracket to grip the beading. Roller bearings of present invention are manufactured from any materials acceptable in the art.

Until the holder is secured to the beading, the pivoting bracket's roller bearing can be moved either toward or away from the first roller bearing. When the holder is closed and secured, the first and second roller bearings grip tautly the beading. In select embodiments, a fastener can be used to clip securely the pivoting bracket against the mounting bracket. Other embodiments of the present invention can include a dowel located on one of the brackets and a corresponding aperture on the opposite bracket to further secure the brackets against movement. In yet other embodiments of the present invention, a spring can be loaded onto the bolt to force the pivoting bracket against the mounting bracket.

Figure 1:
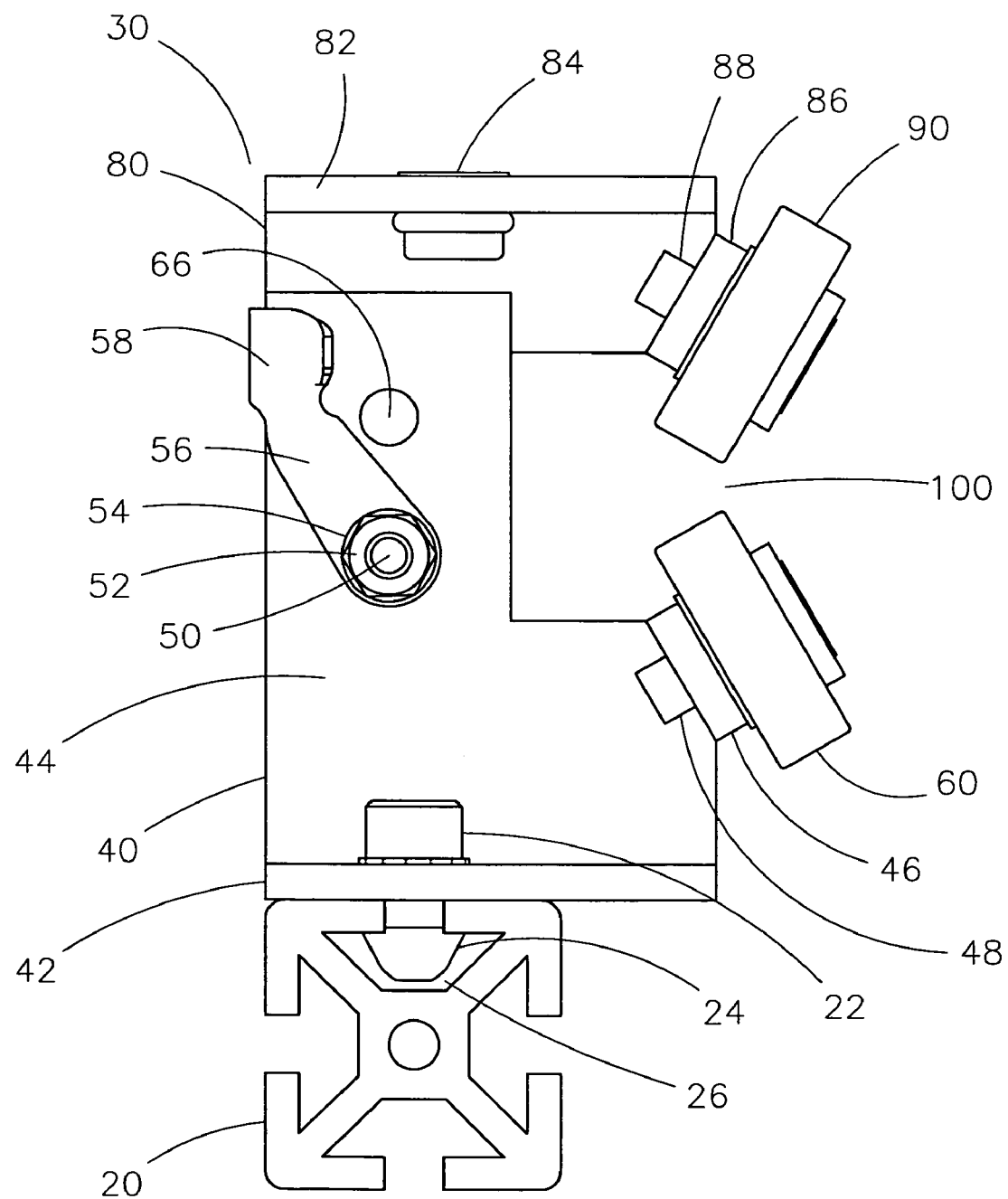
FIG. 1 is a side view of an embodiment of a holder of the present invention showing the spring side of the spring-loaded bolt.

FIG. 1 is a side view of an embodiment of a holder of the present invention showing the spring side of the spring-loaded bolt. Holder (30) is attached to conveyor frame (20) with bolt (22). Bolt (22) includes a head (28) and a locking end (24) that rides in channel (26) of conveyor frame (20), and bolt (22) secures base (42) of mounting bracket (40) to conveyor frame (20). As shown, base (42) and shoulder (44) of mounting bracket (40) are integrally manufactured. However, when engineering parameters require, base (42) and shoulder (44) are composite elements of the present invention. A shown, mounting bracket (40) is a generally L-shaped bracket, but mounting bracket (40) can also be manufactured in other shapes and still function in accordance with the present invention.

Extending through mounting bracket (40) is bolt (50). Between nut (52) and mounting bracket (40), nut (52) secures spring (54) about bolt (50) and applies a constant tension to spring (54). When toolless manual force is applied to lever (56), it can pivot about bolt (50). Lever (56) including clip (58) extends from bolt (50) toward the rear margin of mounting bracket (40). And as shown lever (56) and clip (58) are integrally formed to create a fastener.

Dowel (66) extends into an aperture of pivoting bracket (80). As shown, top plate (82) of pivoting bracket (80) includes aperture (84). However, select embodiments of the present invention do not include top plate (82).

Extending from pivoting bracket (80) is arm (86). Axle (88) secures roller bearing (90) to arm (86) of pivoting bracket (80). In select embodiments, pivoting bracket (80) can have a projection extending therefrom for holding roller bearing (90).

Extending from mounting bracket (40) is arm (46). Axle (48) secures roller bearing (60) to arm (46) of mounting bracket (40). And in select embodiments, pivoting mounting bracket (40) can have a projection extending therefrom for holding roller bearing (60). Between roller bearing (60) and roller bearing (90) is passage (100).

Figure 2:
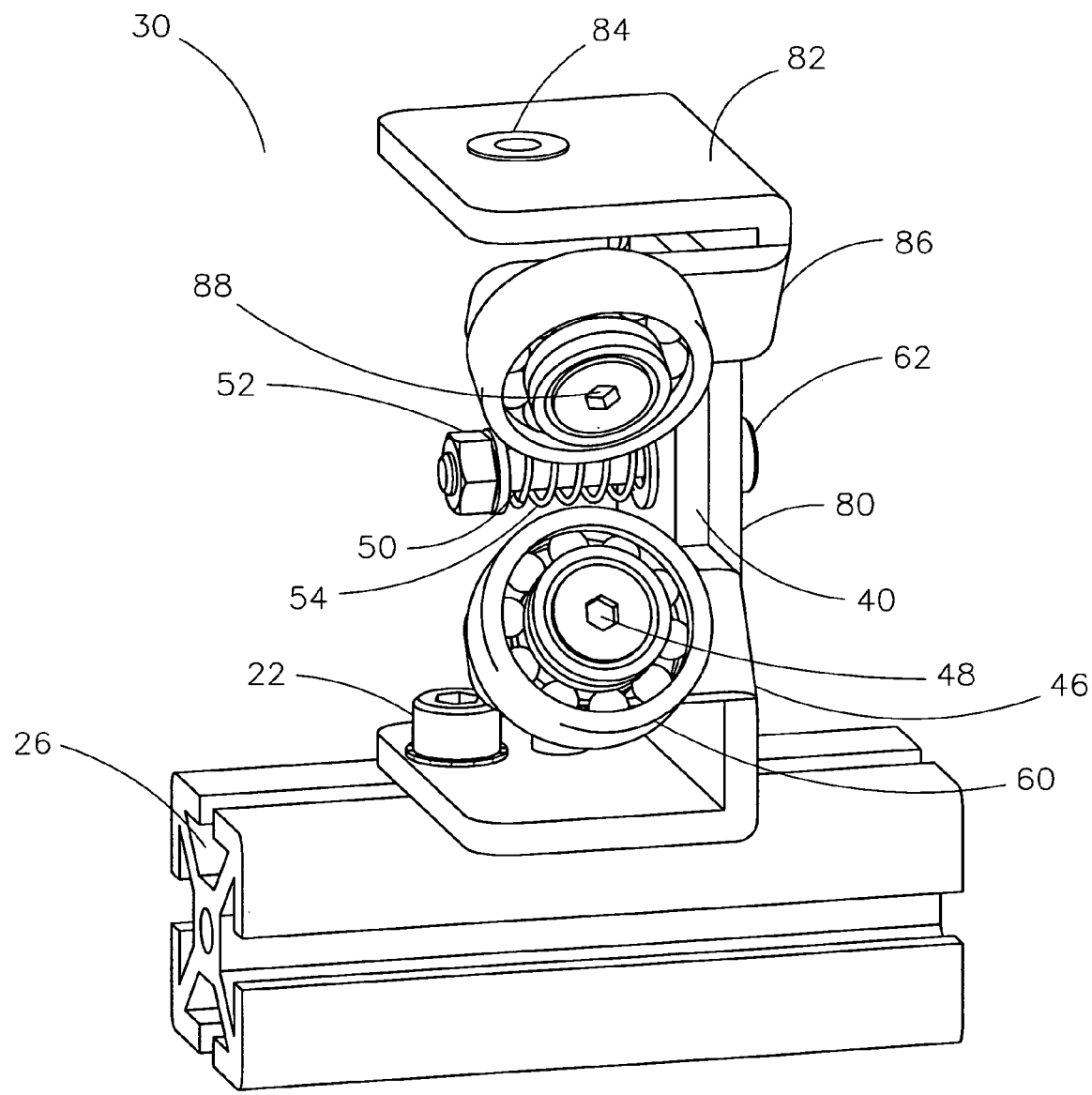
FIG. 2 is a frontal view of an embodiment of a holder of the present invention.

FIG. 2 is a frontal view of an embodiment of a holder of the present invention. Head (62) of bolt (50) contacts pivoting bracket (80) while bolt (50) extends though both pivoting bracket (80) and mounting bracket (40). The dowel can extend from mounting bracket (40) into pivoting bracket (80), or when engineering guidelines require, the dowel can extend from pivoting bracket (80) into mounting bracket (40). Spring-loaded bolt (50, 52, 54, 62) forces pivoting bracket (80) against mounting bracket (40). Forcing pivoting bracket (80) away from mounting bracket (40) releases dowel (66) of mounting bracket (40) from its corresponding aperture of pivoting bracket (80).

Figure 3:
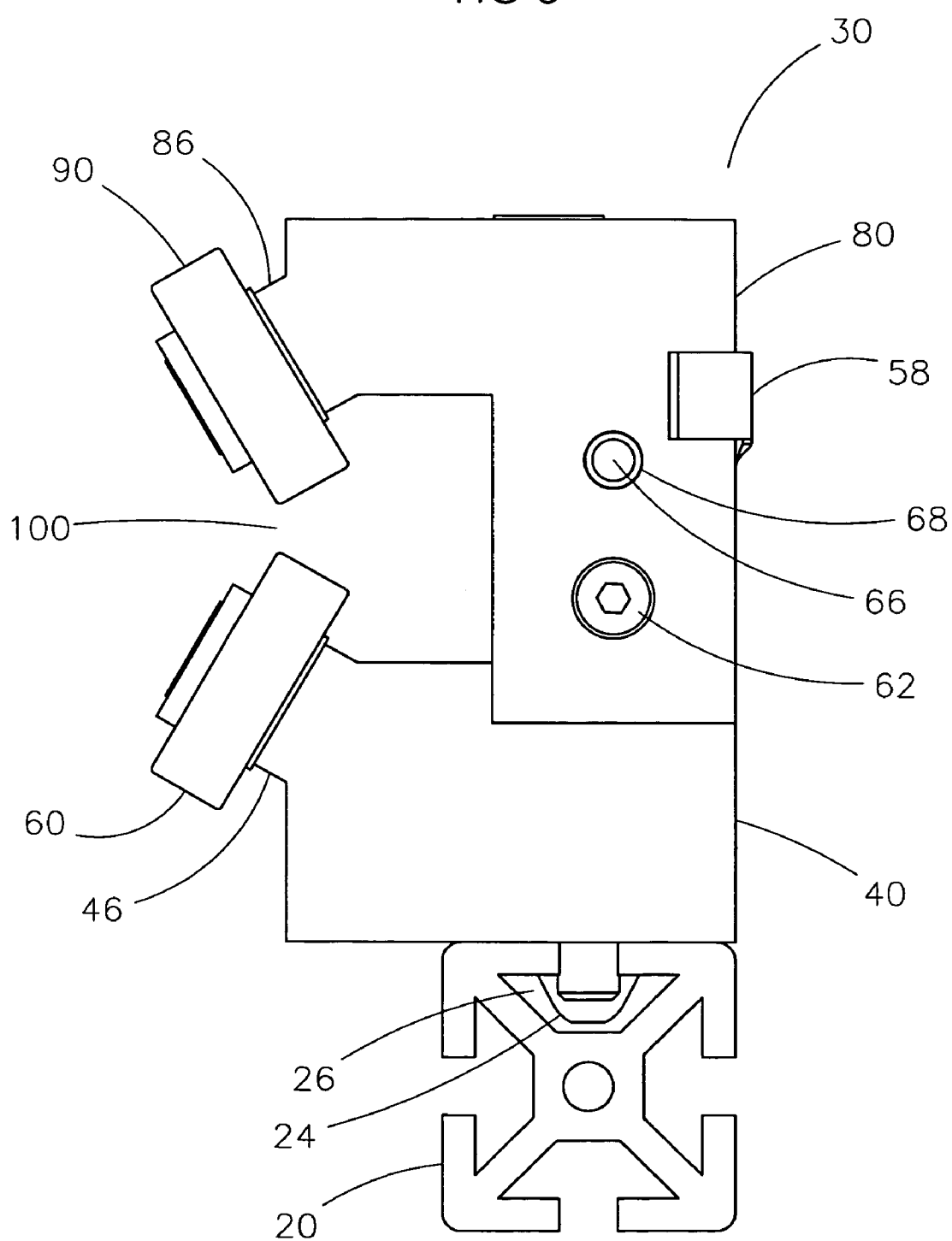
FIG. 3 is a side view of an embodiment of a holder of the present invention showing the side of the holder opposite the spring of the spring-loaded bolt.

FIG. 3 is a side view of an embodiment of a holder of the present invention showing the side of the holder opposite the spring of the spring-loaded bolt. Mounting bracket (40) is attached to conveyor frame (20). Clip (58) can secure mounting pivoting bracket (80) against mounting bracket while dowel (66) extending from mounting bracket (40) into aperture (68) can prevent pivoting bracket (80) from pivoting.

Figure 4:
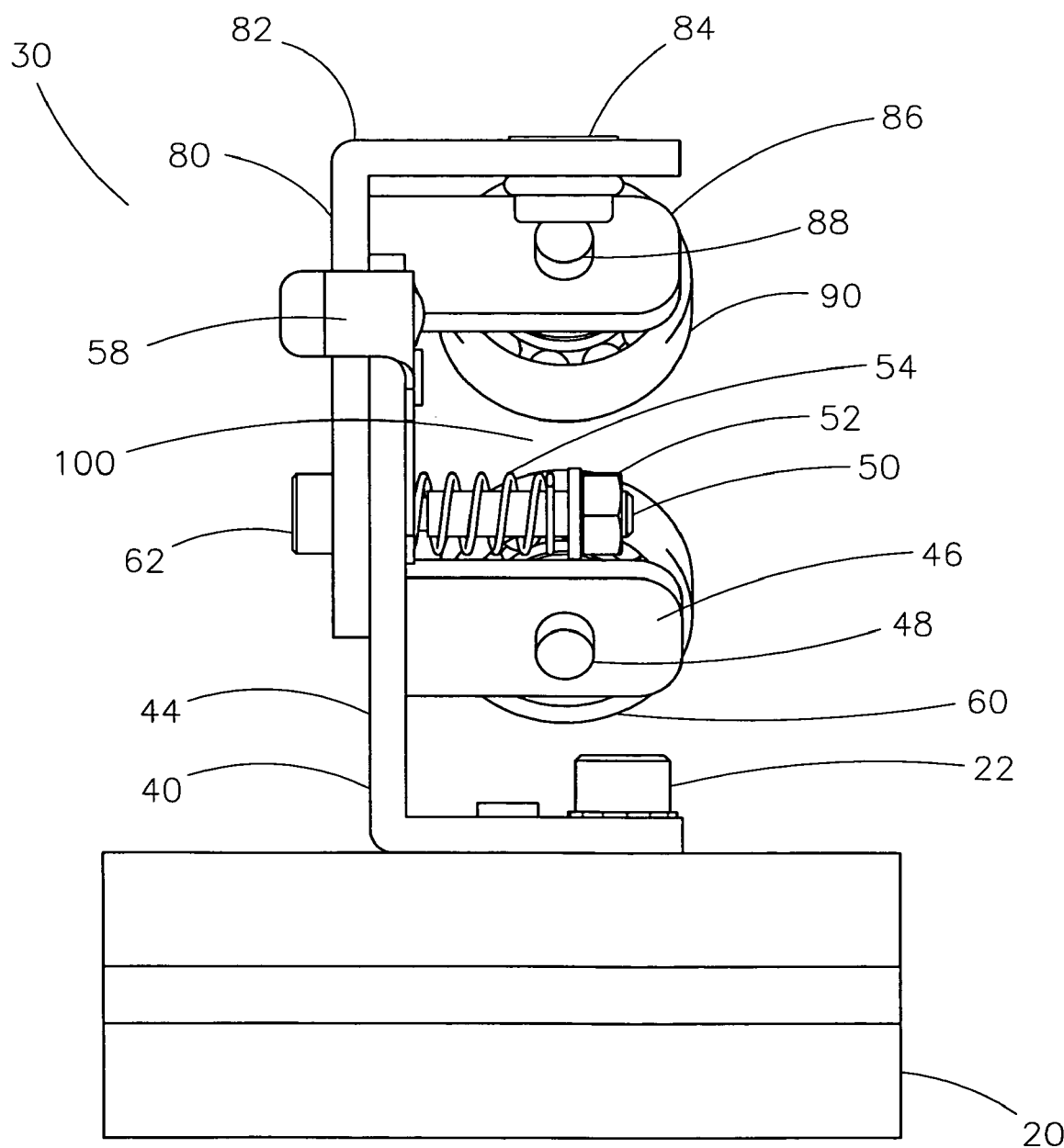
FIG. 4 is a rear view of an embodiment of a holder of the present invention.

FIG. 4 is a rear view of an embodiment of a holder of the present invention. As shown, axle (88) secures roller bearing (90) to arm (86) of pivoting bracket (80) while axle (48) attaches roller bearing (60) to arm (46) of mounting bearing (40). Passage (100) for the conveyor belt is created between roller bearing (40) and roller bearing (90). Spring (54) of bolt (50) forces pivoting bracket (80) against shoulder (44) of mounting bracket (40). Fastener (58) further secures pivoting bracket (80) against mounting bracket (40). To pivot the pivoting bracket (80), without using tools, fastener (58) is manually pushed downward to unclip the rear margins of mounting bracket (40) and pivoting bracket (80). Pivoting bracket (80) can then be forced away from the dowel and pivoted about spring loaded bolt (50).

Figure 5:
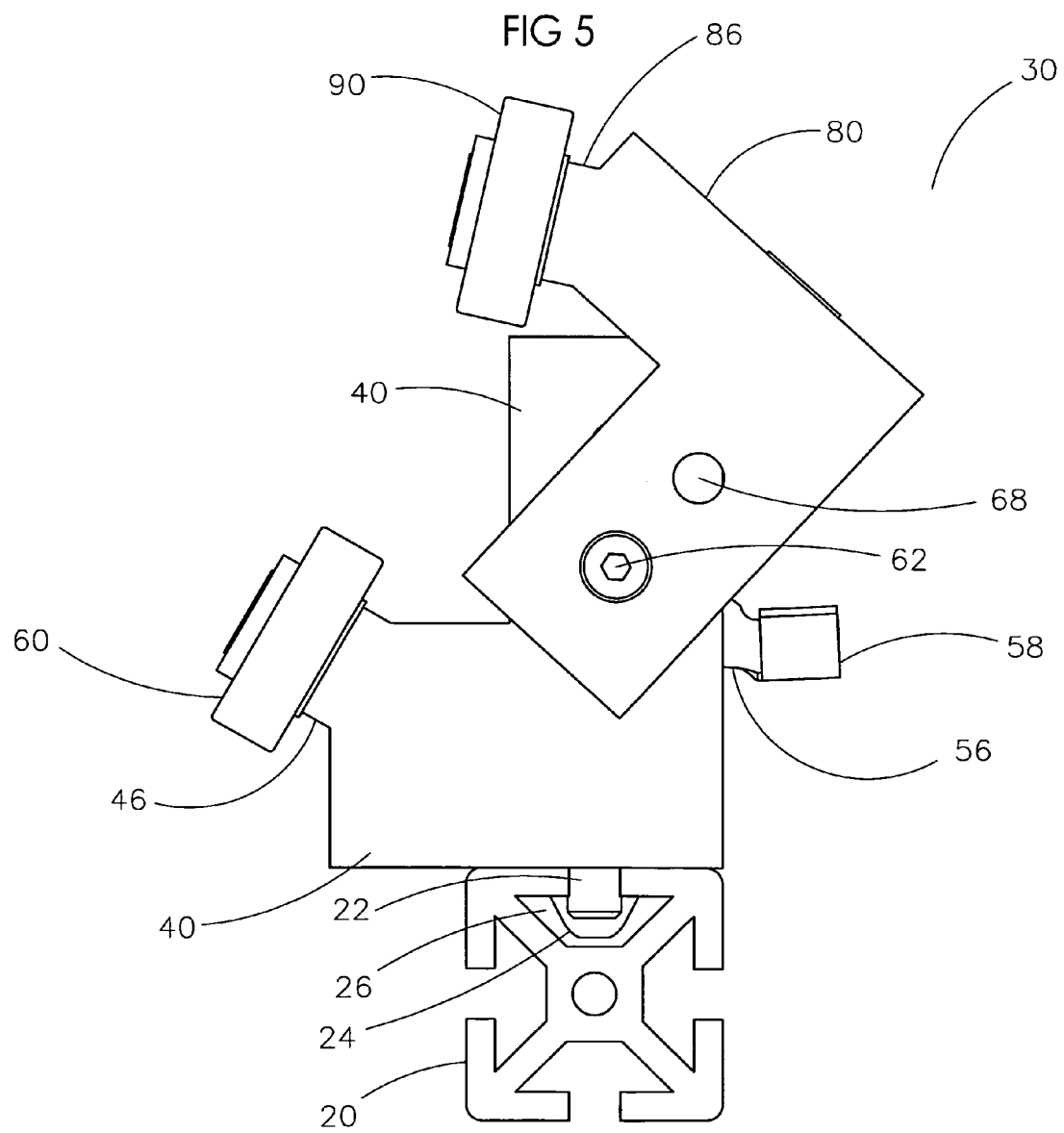
FIG. 5 is a side view of an embodiment of a holder of the present invention showing the side of the holder opposite the spring of the spring-loaded bolt.
Figure 6:
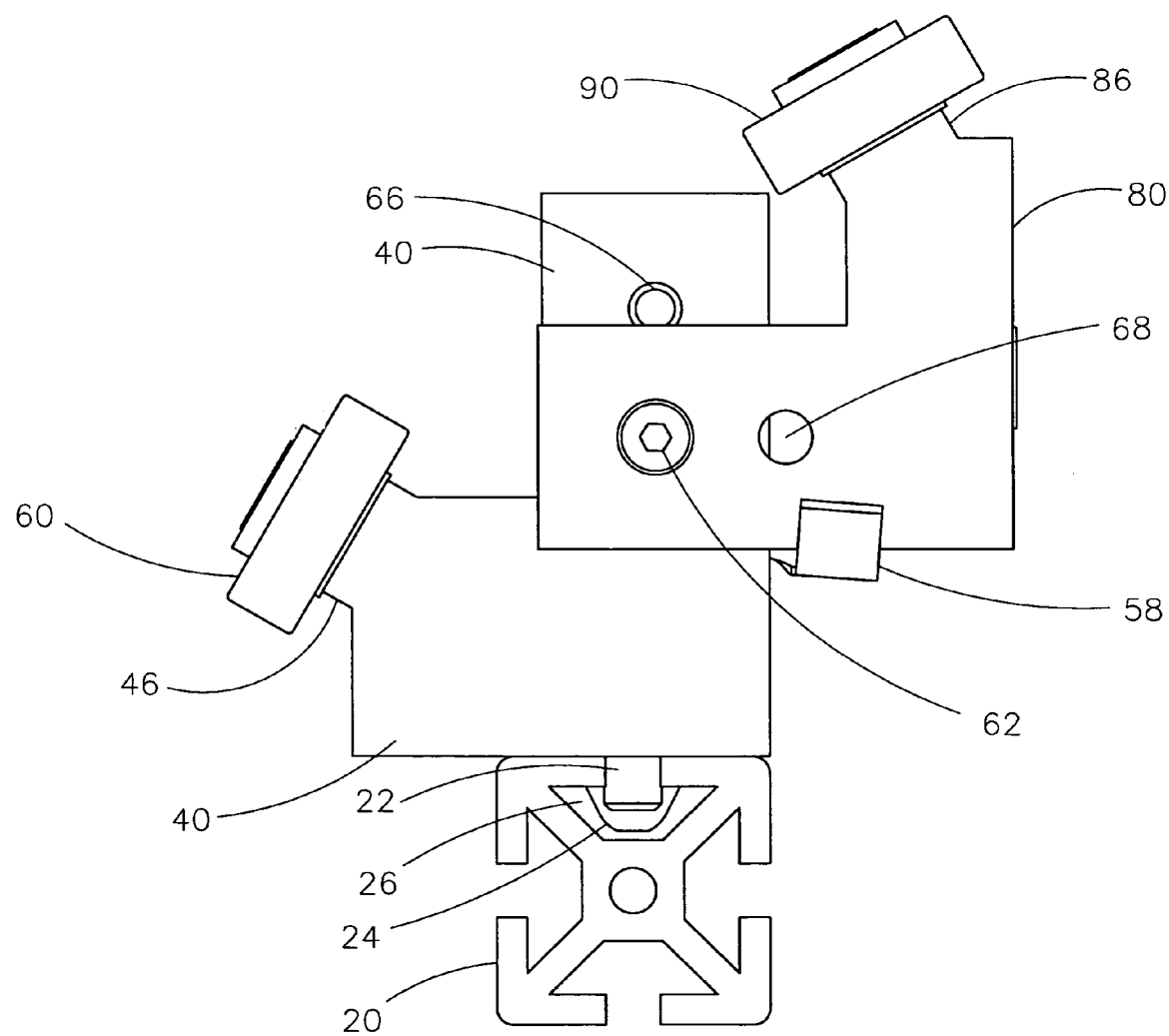
FIG. 6 is a side view of an embodiment of a holder of the present invention showing the side of the holder opposite the spring of the spring-loaded bolt.

FIG. 5 is a side view of an embodiment of a holder of the present invention showing the side of the holder opposite the spring of the spring-loaded bolt. As shown in FIG. 5, holder (30) is partially opened. In a similar vein to FIG. 5, FIG. 6 is a side view of an embodiment of a holder of the present invention showing the side of the holder opposite the spring of the spring-loaded bolt. As shown in FIG. 6, holder (30) is fully opened.

Like FIG. 1, FIG. 7 is a side view of an embodiment of a holder of the present invention showing the spring side of the spring-loaded bolt, but with the additional structure of conveyor belt (110). Beading (120) is attached to conveyor belt (110). When holder (30) is closed, beading (120) is gripped tautly between roller bearing (60) and roller bearing (90). As endless loop conveyor belt (110) circulates about the conveyor, beading lips (122 and 124) and belt (110) move through passage (100) between roller bearings (60 and 90).

Steps associated with the practice of the present invention and method are set forth in FIGS. 8-11. Those steps are related to the practice of using the quick release holder's structures previously set forth.

Having disclosed the invention as required by Title 35 of the United States Code, Applicant now prays respectfully that Letters Patent be granted for his invention in accordance with the scope of the claims appended hereto.

What is claimed is:

1. A holder for a beading of a conveyor belt, comprising:
   a) a base supporting and integrally formed with a generally L-shaped lower bracket, wherein said base includes an aperture for receiving a bolt for attaching said base to a conveyor frame;
   b) a spring-loaded bolt for connecting said generally L-shaped lower bracket with a generally L-shaped pivoting upper bracket such that said spring-loaded bolt causes said generally L-shaped pivoting upper bracket to contact said generally L-shaped lower bracket;
   c) a dowel extending between said generally L-shaped lower bracket and said generally L-shaped pivoting upper bracket;
   d) a first arm integrally formed with said generally L-shaped lower bracket for supporting a first roller bearing for gripping an edge of a beading;
   e) a second arm integrally formed with said generally L-shaped pivoting upper bracket for supporting a second roller for gripping an edge of said beading;
   e) a passage between said first roller bearing and said second roller bearing for said beading; and
   f) a lever pivotable about said spring-loaded bolt further comprising a fastener for securely clipping said generally L-shaped pivoting bracket against said generally L-shaped lower bracket.

2. The invention of claim 1 wherein:
   i) said first roller bearing is angled away from said conveyor belt for gripping said beading; and
   ii) said second roller bearing is angled away from said conveyor belt for gripping said beading.

3. A holder for a beading of a conveyor belt, comprising:
   a) a base supporting and integrally formed with a generally L-shaped lower bracket; said base further comprising at least one aperture for receiving a connector for connecting said base to a conveyor frame;
   b) a spring-loaded bolt for connecting said generally L-shaped lower bracket with a pivoting upper bracket such that said spring-loaded bolt causes said pivoting upper bracket to contact said generally L-shaped lower bracket as said pivoting upper bracket pivots about said spring-loaded bolt;

c) a first rotable bearing attached to said generally L-shaped lower bracket;
d) a second rotable bearing attached to said pivoting upper bracket; and
e) a lever pivotable about said spring-loaded bolt; said lever further comprising a fastener for locking said upper pivoting bracket against said generally L-shaped lower bracket.

4. The invention of claim 3 further comprising a dowel extending between said generally L-shaped lower bracket and said pivoting upper bracket.

5. The invention of claim 4 further comprising:
a) a first arm extending from said generally L-shaped lower bracket for supporting said first rotable bearing; and
b) a second arm extending from said upper pivoting bracket for supporting said second rotable bearing.

6. A holder for a conveyor belt, comprising:
a) a stationary bracket for mounting said holder to a conveyor frame further comprising:
   i) a base abutting said conveyor frame, wherein said base further includes a first aperture;
   ii) a shoulder standing from said base, wherein said shoulder further includes a second aperture and a third aperture; and
   iii) a first arm projecting from said shoulder;
b) a pivoting bracket extending above said shoulder comprising:
   i) a fourth aperture;
   ii) a fifth aperture; and
   iii) a second arm projecting from said pivoting bracket;
c) a first rotable bearing mounted to said first arm;
d) a second rotable bearing mounted to said second arm;
e) a bolt extending through said second aperture and said fourth aperture connecting said stationary bracket and said pivoting bracket; and
f) a fastener for holding said stationary bracket against said pivoting bracket.

7. The invention of claim 6 further comprising a dowel.

8. The invention of claim 7 further comprising a spring.

9. A holder for a conveyor belt, comprising:
a) a stationary bracket for mounting said holder to a conveyor frame;
b) a bolt connecting a pivoting bracket to said stationary bracket;
c) a first roller bearing attached to said stationary bracket;
d) a second roller bearing attached to said pivoting bracket and aligned with said first roller bearing creating a passage between said first roller bearing and said second roller bearing for receiving said beading; and
e) a fastener to secure said pivoting bracket against said stationary bracket.

10. The invention of claim 9 further comprising a spring loaded onto said bolt.

11. The invention of claim 9 further comprising a dowel.

12. The invention of claim 11 further comprising:
i) a first arm extending from said mounting bracket for supporting said first roller bearing; and
ii) a second arm extending from said pivoting bracket for supporting said second roller bearing.

13. The invention of claim 12 wherein:
i) said first roller bearing's contacting surface for gripping said beading is angled away from said conveyor belt; and
ii) said second roller bearing's contacting surface for gripping said beading is angled away from said conveyor belt.

14. A method of toollessly opening or closing a holder for a conveyor belt, wherein said holder is attached to a conveyor frame and said holder comprises: a spring-loaded bolt causing a pivoting bracket to abut a stationary bracket, a dowel extending between said stationary bracket and said pivoting bracket, a first roller bearing attached to said stationary bracket and a second roller bearing attached to said pivoting bracket; said method comprising the steps of:
a) disengaging said dowel extending between said stationary bracket and said pivoting bracket, thereby tensioning said spring such that said pivoting bracket is free to pivot about said bolt; and
b) pivoting said pivoting bracket to move said second roller bearing either toward or away from said first roller bearing.

15. The method of claim 14 further comprising the steps of:
a) extending a first arm from said mounting bracket for supporting said first roller bearing; and
b) extending a second arm from said pivoting bracket for supporting said second roller bearing.

16. The method of claim 15 further comprising the step of positioning said fastener on a lever extending from said spring-loaded bolt.

17. The method of claim 16 further comprising the step of moving a fastener away from said mounting bracket and said pivoting bracket to open said holder.

* * * * *